US009195296B2

(12) United States Patent
Shahidi et al.

(10) Patent No.: US 9,195,296 B2
(45) Date of Patent: Nov. 24, 2015

(54) APPARATUS AND METHODS FOR OPTIMIZING POWER CONSUMPTION IN A WIRELESS DEVICE

(75) Inventors: Reza Shahidi, San Diego, CA (US); Alex Kuang-Hsuan Tu, San Diego, CA (US); Brian J. Salsbery, San Diego, CA (US); Ajith T. Payyappilly, San Diego, CA (US); Xiaodong Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 317 days.

(21) Appl. No.: 12/889,255

(22) Filed: Sep. 23, 2010

(65) Prior Publication Data
US 2011/0072295 A1 Mar. 24, 2011

Related U.S. Application Data

(60) Provisional application No. 61/245,477, filed on Sep. 24, 2009.

(51) Int. Cl.
*G06F 1/32* (2006.01)

(52) U.S. Cl.
CPC .............. *G06F 1/324* (2013.01); *G06F 1/3203* (2013.01); *G06F 1/3215* (2013.01); *Y02B 60/1217* (2013.01)

(58) Field of Classification Search
CPC ....... G06F 1/32; G06F 1/3209; G06F 1/3221; G06F 1/324
USPC .......................................................... 713/300
See application file for complete search history.

(56) References Cited

U.S. PATENT DOCUMENTS 6,263,449 B1  7/2001  Motohashi
7,472,306 B2 * 12/2008  Tsui et al. ..................... 713/600

(Continued)

FOREIGN PATENT DOCUMENTS

CN     1851579 A    10/2006
CN   101387905 A     3/2009

(Continued)

OTHER PUBLICATIONS

International Search Report and Written Opinion—PCT/US2010/050179, International Search Authority—European Patent Office—Jan. 25, 2011.

(Continued)

*Primary Examiner* — Kim Huynh
*Assistant Examiner* — Eric Chang
(74) *Attorney, Agent, or Firm* — Chui-kiu Teresa Wong; Paul Holdaway

(57) ABSTRACT

Apparatus and methods are disclosed for power optimization in a wireless device. The apparatus and methods effect monitoring the amount of data stored in a data buffer that buffers data input to and data output from a processor. Dependent on the amount of data stored in the buffers parameters of a control function, such as a Dynamic Clock and Voltage Scaling (DCVS) function are modified based on the amount of data stored in the data buffer. By modifying or pre-empting the parameters of the control function, which controls at least processor frequency, the processor can process applications more dynamically over default parameter settings, especially in situations where one or more real-time activities having strict time constraints for completion are being handled by the processor as evinced by increased buffer depth. As a result, power usage is further optimized as the control function is more responsive to processing conditions.

24 Claims, 7 Drawing Sheets

(56) References Cited

U.S. PATENT DOCUMENTS

| | | |
|---|---|---|
| 2004/0158752 A1 | 8/2004 | Borza et al. |
| 2004/0193937 A1 | 9/2004 | Tarui et al. |
| 2006/0161799 A1 | 7/2006 | Degenhardt |
| 2006/0174151 A1* | 8/2006 | Lin et al. ................. 713/500 |
| 2007/0009067 A1* | 1/2007 | Michalak ................. 375/346 |
| 2007/0242313 A1 | 10/2007 | Shiomi |
| 2008/0028249 A1 | 1/2008 | Agrawal |
| 2008/0298528 A1 | 12/2008 | Fukushima |
| 2009/0158061 A1 | 6/2009 | Schmitz et al. |

FOREIGN PATENT DOCUMENTS

| | | |
|---|---|---|
| GB | 2455354 A | 6/2009 |
| JP | H0527867 A | 2/1993 |
| JP | H09297688 A | 11/1997 |
| JP | H11205168 A | 7/1999 |
| JP | 2003087172 A | 3/2003 |
| JP | 2004164566 A | 6/2004 |
| JP | 2004241900 A | 8/2004 |
| JP | 2004295450 A | 10/2004 |
| JP | 2004362282 A | 12/2004 |
| JP | 2005032038 A | 2/2005 |
| JP | 2007233881 A | 9/2007 |
| JP | 2007282097 A | 10/2007 |
| JP | 2008278325 A | 11/2008 |
| JP | 2008289054 A | 11/2008 |
| JP | 2008299612 A | 12/2008 |
| JP | 2009130507 A | 6/2009 |
| JP | 2009171356 A | 7/2009 |
| WO | WO2007042863 A1 | 4/2007 |

OTHER PUBLICATIONS

Takagi N., et al., "Shared Resource Access Control with DVFS for Low-Power Chip Multiprocessors", IPSJ SIG Technical Report, 2009 (1) [CD-ROM], Japan, The Information Processing Society of Japan (IPSJ), Jun. 15, 2009, vol. 2009-OS-111, No. 35, 10 Pages.

* cited by examiner

APPARATUS AND METHODS FOR OPTIMIZING POWER CONSUMPTION IN A WIRELESS DEVICE

CLAIM OF PRIORITY UNDER 35 U.S.C. §119

The present application for patent claims priority to Provisional Application No. 61/245,477 entitled "PRE-EMPTING DYNAMIC CLOCK AND VOLTAGE SCALING (DCVS) RESPONSE TIME" filed Sep. 24, 2009, and assigned to the assignee hereof and hereby expressly incorporated by reference herein.

BACKGROUND

1. Field

The present disclosure relates generally to apparatus and methods for optimizing power consumption in electronic components, such as in a wireless device. More particularly, the present disclosure relates to methods and apparatus for optimizing power consumption through improvement of circuit response time in electronic components that employ dynamic clock and voltage scaling (DCVS) techniques.

2. Background

Optimizing power consumption in electronic devices is increasingly important, especially for devices such as battery-powered mobile devices. For user convenience, it is desirable that the operational time of a battery be extended as much as possible. There are numerous ways to extend the operational time for mobile devices including reducing the electrical load (i.e. DC current consumption) on the battery.

A way of accomplishing electrical load reduction is to optimize the power consumption of circuitry within a mobile device, such as by active power management of the electronic components within the mobile device. Active power management refers to dynamic techniques used to regulate the amount of DC current consumption depending on the current operational state. One way of dynamically regulating the power consumption of circuitry such as a processor or Central Processing Unit (CPU) is through Dynamic Clock and Voltage Scaling (DCVS). DCVS controls power consumption in a CPU, such as an application processor, as a function of utilization of the CPU. This is accomplished by monitoring the CPU utilization, and then dynamically changing the CPU clock frequency and voltage scaling of the operational voltage based on the monitored CPU utilization. For example, when the CPU utilization is increased relative to the clock frequency, the clock frequency is then dynamically increased, or when CPU utilization is decreased relative to clock frequency, the clock frequency is dynamically decreased, affording power savings when the CPU utilization is lower. Similarly, the voltage scaling may be modified in response to monitored CPU utilization. By dynamically adjusting the clock frequency and voltage of the CPU based on utilization, power consumption can be better optimized.

In future mobile wireless device designs, in particular, DCVS functionality could be moved into a modem processor in mobile wireless devices as well. Currently, known DCVS functionalities optimize response time for power consumption on an application processor that can tolerate a larger delay. If DCVS functionality is incorporated with a processor executing more time sensitive tasks, such as a processor executing one or more real-time activities in a modem processor that have strict time constraints for completions, known DCVS functions may not have quick enough response or processing time to change the frequency and/or voltage of the CPU to adequately process data and thus meet the requirements of all clients of the modem. In certain scenarios, usage of DCVS may result in a lower DC current consumption state with a slower transient response. In such cases, conventional DCVS may result in a processing response time that does not satisfy the needs of all processor clients.

SUMMARY

According to an aspect, a method for power optimization in a wireless device is disclosed. The method includes monitoring the amount of data stored in a data buffer that buffers at least one of data input to and data output from at least one processor. Further, the method includes modifying parameters of a control function based on the amount of data stored in the data buffer, the control function configured to control at least an operating speed of the at least one processor based on loading of the at least one processor.

According to another aspect, an apparatus for power optimization in a wireless device is disclosed. The apparatus includes at least one first monitor configured to monitor the amount of data stored in a data buffer that buffers at least one of data input to and data output from at least one processor in the wireless device. A control unit is also included in the apparatus and is configured to modify parameters of a control function based on the amount of data stored in the data buffer, where the control function is a type configured to control at least an operating speed of the at least one processor based on loading of the at least one processor.

According to yet another aspect, an apparatus for power optimization in a wireless device is disclosed. The apparatus comprises means for monitoring the amount of data stored in a data buffer that buffers at least one of data input to and data output from at least one processor. Also included is means for modifying parameters of a control function based on the amount of data stored in the data buffer, the control function configured to control at least an operating speed of the at least one processor based on loading of the at least one processor.

According to still one more aspect, a computer program product comprising a computer-readable medium is disclosed. The computer-readable medium includes code for causing a computer to monitor the amount of data stored in a data buffer that buffers at least one of data input to and data output from at least one processor in a wireless device. Also the computer-readable medium includes code for causing a computer to modify parameters of a control function based on the amount of data stored in the data buffer, the control function configured to control at least an operating speed of the at least one processor based on loading of the at least one processor.

DETAILED DESCRIPTION

Figure 1:
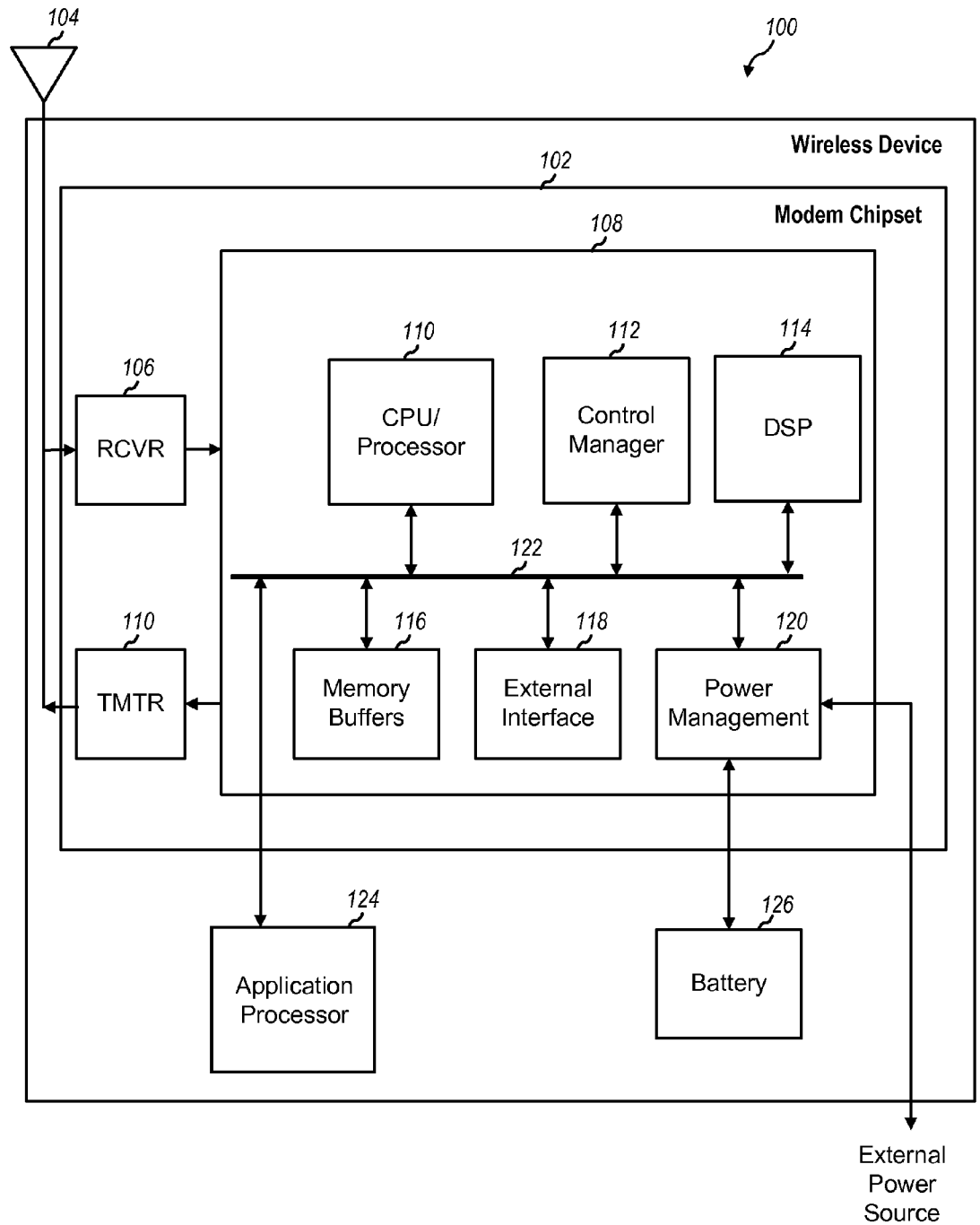
FIG. 1 shows a block diagram of a design of a wireless device operable in a wireless communication network.

This presently disclosed methods and apparatus provide a mechanism for data services to shorten the response time of control algorithms such as DCVS so that data throughput performance for a CPU or processor is maintained. In a particular aspect, the present disclosure features methods and apparatus for setting or modifying the minimum CPU level for DCVS to accommodate data moving requirements that run on a high priority task. An interface or similar means between DCVS and its clients may be provided to change the DCVS response time or DCVS sensitivity. As part of this methodology, the receiver (Rx), transmit (Tx), or other data buffers are monitored. If any buffer fills up above a first predetermined threshold, data services may call a DCVS Application Programming Interface (API) to shorten the response time, which results in increasing CPU clock frequency. In another aspect, when the buffer level drops below a Low or second predetermined threshold, data services may revert the DCVS response time to a default value. As a result, if CPU utilization is high but the clock frequency is low with large amounts of data to be moved, the present methods and apparatus afford increase in the clock frequency before packet loss is experienced. Furthermore, according to one aspect, if CPU utilization is low with a low clock frequency and there is large amount of data to be moved, the disclosed methods and apparatus do not change the clock frequency, as the CPU is not the cause, but rather other problems such as a poor quality radio connection. If CPU utilization is high but there is low data activity, the change in CPU clock will be based on default DCVS setting.

The word "exemplary" is used herein to mean "serving as an example, instance, or illustration." Any embodiment described herein as "exemplary" is not necessarily to be construed as preferred or advantageous over other embodiments.

The techniques described herein may be used for various wireless communication networks such as CDMA networks, TDMA networks, FDMA networks, OFDMA networks, SC-FDMA networks, wireless local area networks (WLANs), and other networks. The terms "network" and "system" are often used interchangeably. A CDMA network may implement a radio access technology (RAT) such as Universal Terrestrial Radio Access (UTRA), cdma2000, etc. UTRA includes Wideband CDMA (WCDMA) and other variants of CDMA. cdma2000 covers CDMA 1X and High Rate Packet Data (HRPD). A TDMA network may implement a RAT such as Global System for Mobile Communications (GSM). An OFDMA network may implement a RAT such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). A WLAN may implement a RAT such as IEEE 802.11, Hiperlan, etc. The techniques described herein may be used for the wireless networks and RATs mentioned above as well as other wireless networks and RATs. For clarity, certain aspects of the techniques are described below for 1xEV-DO (Evolution-Data Optimized) or High Rate Packet Data (HRPD), and HRPD terminology is used in much of the description below.

FIG. 1 shows a block diagram of a design of a wireless device 100 operable in a wireless communication network. Such a wireless device 100 may also be referred to as a user equipment (UE), a mobile station, a terminal, an access terminal, mobile equipment, a subscriber unit, a station, etc. The wireless device may be a cellular phone, a personal digital assistant (PDA), a wireless modem, a handheld device, a laptop computer, etc. In this example, the wireless device 100 may include a wireless modem chipset 102 or similar device that processes data signals and utilizes a control functionality to optimize processing resources, such as DCVS as one example.

As shown in FIG. 1, a receive path (e.g., forward link FL), an antenna 104 may receive signals transmitted by base stations and/or other transmitter stations and may provide a received signal to a receiver (RCVR) 106. Receiver 106 may process (e.g., filter, amplify, frequency downconvert, and digitize) the received signal and provide input samples to a digital section 108 for further processing. In the transmit path, digital section 108 may process data to be transmitted and provide output samples to a transmitter (TMTR) 110. Transmitter 110 may process (e.g., convert to analog, filter, amplify, and frequency upconvert) the output samples and generate a reverse link (RL) signal, which may be transmitted via antenna 104.

Digital section 108 may include various processing, memory, and interface units that support radio communication as well as other various applications. In the design shown in FIG. 1, digital section 108 may include one or more of at least one processor/CPU 110, a control unit or manager 112, a digital signal processor 114, memory buffers 116, an external interface 118, and a power management unit 120, all of which may be communicatively coupled, such as via a bus 122 or similar coupling shown merely for purposes of illustrating the ability of the various units to communicate with each other. Each processor or CPU may comprise one or more of CPUs, digital signal processors (DSPs), reduced instruction set computer (RISC) processors, general-purpose processors, etc. Additionally, each processor may also include an internal memory or external memory. Processors in digital section 108 may perform processing for data transmission (e.g., encoding and modulation), processing for data reception (e.g., demodulation and decoding), higher-layer processing for data exchanged with a wireless network, processing for various applications, etc.

Control manager 112 may direct the operation of various functions in the wireless device 100 including control of power saving algorithms such as DCVS, for example. The control manager 112 may be implemented by a microcontroller, microprocessor, logic circuitry, or any other suitable device to receive inputs, process the inputs, and output commands. Additionally, control manager 112 may be embodied in software run on a processor, or a combination of software and hardware. Memory buffers 116 may store data and/or instructions for various units within digital section 108, including the CPU/Processor 110. Interface unit 118 may interface with other units or processors in the modem 108 or device 102, and input/output (I/O) devices, etc. Power management unit 120 may manage battery power for wireless device 100 and may be coupled to a battery 126 or an external power source. Digital section 108 may be implemented on one or more application specific integrated circuits (ASICs) and/or other integrated circuits (ICs) and within a larger chipset, such as modem chipset 102.

In general, wireless device 100 may include fewer, more and/or different processing, memory, and interface units than those shown in FIG. 1. The number of processors and memories and the types of processors included in digital section 108 may be dependent on various factors such as the communication networks and applications supported by wireless device 100, cost and power considerations, etc.

Wireless device 100 may support various applications. An application may be a software and/or firmware module that performs a particular function. Different applications may be used to support communication via different RATs, to support different services, etc. For example, wireless device 100 may support applications for voice, packet data, video, video telephony (VT), web browser, email, text editor, video games, WLAN, Bluetooth, assisted Global Positioning System (A-GPS), etc. Wireless device 100 may also have one or more data flows for all of the active applications. A data flow may be a stream of data between two specific end points. A data flow may also be referred to as an Internet Protocol (IP) flow, a Radio Link Control (RLC) flow, a Radio Link Protocol (RLP) flow, etc. Different types of data flows may be used for different traffic classes, different quality-of-service (QoS) classes, etc. Each data flow type may or may not be associated with QoS requirements.

Figure 2:
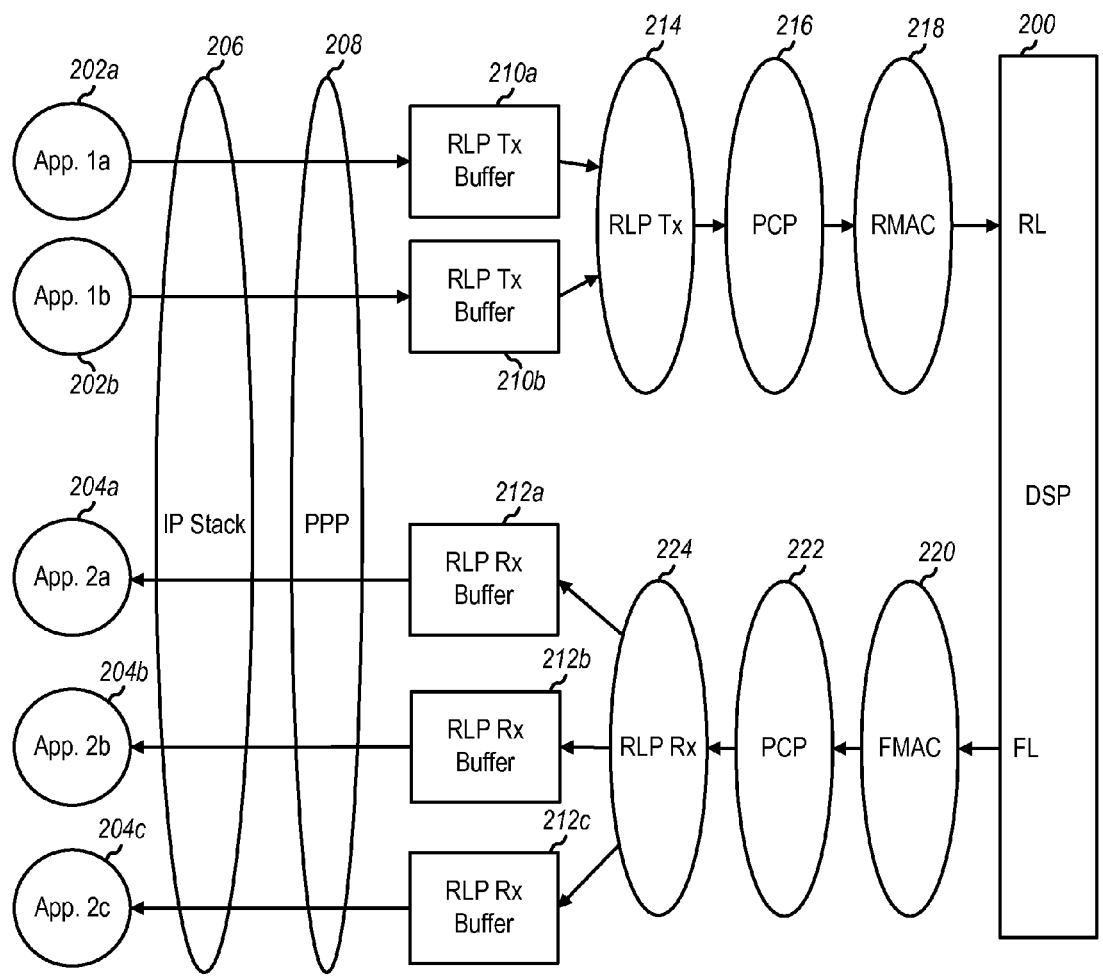
FIG. 2 is an exemplary diagram of data flow in a wireless device.

An example of data flow that may occur for EV DO data in device 100, as merely one example, is illustrated in FIG. 2. This figure is a representative data flow of data between a digital signal processor 200 (e.g., a DSP such as 114 in FIG. 1) and various applications run by other processing circuitry of the modem across various protocols. As shown, a plurality of applications 1a and 1b (denoted with reference numbers 202a-b), and applications 2a, 2b, and 2c (denoted with reference numbers 204a-c) are illustrated. For illustration purposes, applications 202a and 202b are applications generating data to be transmitted on the RL, and applications 204a, 204b, and 204c are applications receiving data over the FL The illustrated bifurcation between RL and FL applications is merely exemplary, and other applications may both generate and receive data. In addition, the applications 202 or 204 may be run on one or more processors or CPUs, such as 110 in FIG. 1 or other application processors in the wireless device 100.

Data flowing from or to the applications 202, 204 may traverse through an Internet Protocol (IP) stack module 206, as well as a Point-to-Point Protocol module (PPP) 208. The data is also buffered by Radio Link Protocol (RLP) Tx buffers 210a, 210b for RL data, and RLP Rx buffers 212a-c for received FL data. Buffers 210, 212 may be buffers in the modem chipset such as 116 in one example. On the RL transmit side, an RLP transmitter 214, a phantom circuit protocol (PCP) module 216, and a reservation-based medium access control (RMAC) module 218 may be used to prepare data for receipt by digital signal processor (DSP) 200 and eventual transmission after signal processing by the DSP 200. On the receiver or FL side, data processed by DSP 200 is delivered to a forward link reservation-based medium access control (FMAC) module 220, a phantom circuit protocol (PCP) module 222, and an RLP receiver 224 prior to buffering in the RLP Rx buffers 212.

Figure 3:
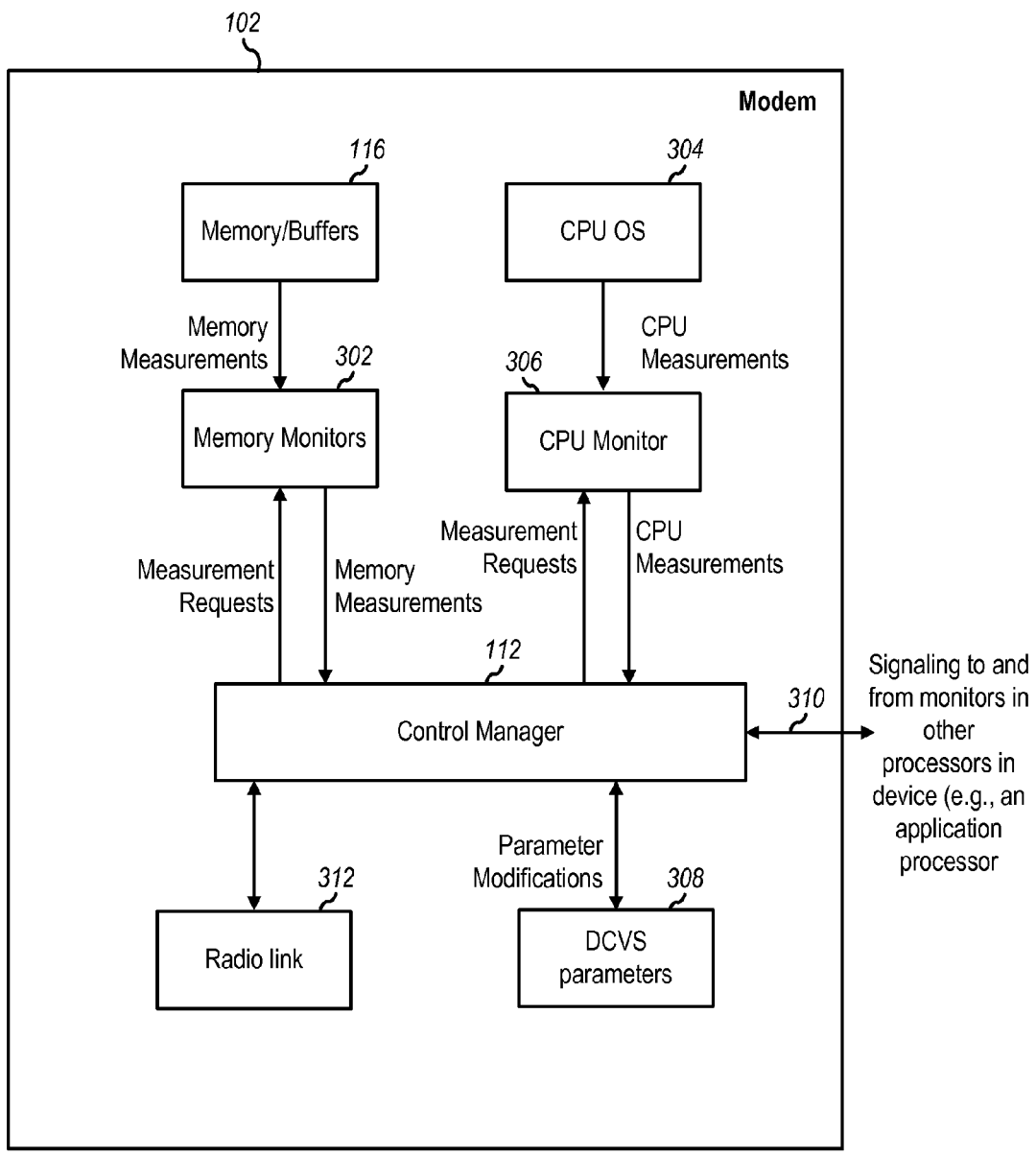
FIG. 3 is a block diagram of an exemplary scheme for monitoring data rate flow and changing parameters of at least a power optimizing control function in a wireless device.

FIG. 3 illustrates a block diagram of an exemplary scheme for monitoring data rate flow and changing parameters of at least a power optimizing control function in a wireless device, such as a DCVS function. FIG. 3, in particular, illustrates the scheme in the environment of the modem chipset 102, which was illustrated in FIG. 1. It is noted, however, that this is merely exemplary and that the scheme could be implemented in other portions of wireless or mobile devices utilizing power optimizing control functions such as DCVS.

The control manager 112 is configured to receive and number of inputs from, as well as issue commands to either monitors, a DCVS (e.g., a DCVS API or similar interface to change parameters), or to other processors, such as an application processor. One such input/output effects monitoring of memory buffers, such as the illustrated buffers 116. A memory monitor 302 or similar functional unit monitors or measures the level or depth of the buffers 116. In an aspect, the control manager 112 may request memory measurements from the monitor 302, which in turn sends one or more measurements to the control manager 112.

Control manager 112 may also be configured to monitor measurements of the CPU (e.g., 110), and in a particular aspect to monitor the CPU operating system (OS) 304 to determine the current utilization level of the CPU. A CPU monitor 306 may be used to collect CPU measurements and communicate the measurements to control manager 112 when requested by the manager 112.

The control manager 112, as will be explained in more detail later in connection with FIGS. 4-7, may utilize one or more of the measured buffer depth and CPU utilization to determine modifications to a control function, such as a DCVS algorithm. In the illustrated example, the control manager 112 may communicate with the DCVS, such as via a DCVS API, to change or modify parameters 308 of the function.

The control manager 112 may also request and/or receive measurements from other processors in a wireless or mobile device (e.g., 100) via communicative coupling 310. Furthermore, a stable, but bad radio link condition may drive low data throughput if the data throughput is gated by the bad radio link condition and if this condition does not require a high processor clock speed. Additionally, low data throughput may be due to a fading radio link condition where the data buffer depth may be high or low depending on the radio link condition. For example, the mobile device may need a higher processor clock speed if the radio link protocol (RLP)/MAC layer are busy performing link re-transmission. Low data throughput may also be due to congestion control at the transport layer where the data buffer depth is high when the congestion control is triggered and the processor is running a maximum processor clock speed and needs to throttle back the data rate to maintain the data call quality of service (QoS). Accordingly, the control manager 112 may receive further information concerning the condition of the radio data link (312) for determining when and how to modify the control function parameters. Thus, information concerning the radio link condition affords determination of other problems affecting data through beyond measurement of the data buffer depth or the CPU utilization.

In an aspect, the present apparatus and methods, as mentioned before, effect modification of DCVS parameters based on one or more of the buffer depth, CPU utilization, or radio link condition in order to better optimize the DCVS function when encountering conditions requiring processing response time for which a default or conventional DCVS may not satisfy the needs of all processor clients. In the following discussion, various examples of conditions that may be addressed by the present disclosed methods and apparatus are discussed. This is not meant to be exhaustive, however, of all conditions that may be improved by the present disclosure.

In one example, a mobile device that is not currently transmitting but is in a passive receive state may be placed in a standby mode to minimize active DC current consumption. In another example, the electronics clock speed and/or operational voltage may be managed to optimize DC current consumption. In general, processing performance, for example, processing speed is optimized with a faster clock speed and/or higher voltage at the cost of increased DC current consumption and increased thermal dissipation. Thus, improved battery operational life might be obtained by reducing the clock speed and/or DC voltage when optimal processing performance is not required.

In another example, the present disclosure discloses schemes to shorten the response time of DCVS so that the required data throughput performance is maintained. An advantage of these schemes is that improved battery operational time may be obtained by not using the highest processor clock speed in all cases. For example, when a data call is connected, there is no need for maximum processor clock speed capability. Consequently, improved DC power savings may be achieved since most data calls do not utilize a high data rate link due to radio link performance or network resource limitations. On average, a lower processor clock speed setting would be sufficient to meet radio link capability. Accordingly, the present disclosure provides a feedback capability to balance DC power consumption against peak processor throughput needs.

In another example, electronic components, such as a processor, have a DCVS response time that is normally optimized strictly based on DC power consumption. This optimization criterion is appropriate for processor tasks that have high tolerance for increased delay. In one example, non-real time processing tasks are not strictly constrained in execution time, so that conventional DCVS techniques are suitable for minimal DC power consumption with acceptable performance degradation. However, real-time processing tasks are strictly constrained in execution time and cannot tolerate excessive delay. For example, a modem processor (e.g., processor 110) requires a response time that depends on how fast data needs to be processed for physical layer, medium access control (MAC) layer, and data services. The present disclosure proposes setting a minimum processing level for DCVS to accommodate physical layer and MAC layer data moving requirements that run on a high priority processor task. In addition, the present disclosure provides an interface (e.g., 112 and 208) between DCVS and its clients to change the DCVS response time or DCVS sensitivity.

In yet another example, data services will monitor transmit, receive or other data buffers (e.g. 116 and monitor 202). If any buffer 116 fills up beyond a high threshold, data services (e.g., control manager 112) will call the DCVS application program interface (API) to shorten the response time by increasing processor clock speed. If the buffer level drops below a low threshold, data services can revert the DCVS response time to a default value. As a result, if processor utilization is high but the processor clock speed is low with a large amount of data to be moved, this procedure increases the processor clock speed before a packet loss is incurred. Conversely, if processor utilization is low with low processor clock speed and there is a large amount of data to be moved, this procedure does not change the processor clock speed, as the processor is not the cause. If the processor utilization is high but there is low data activity, the change in processor clock speed can be based on a default DCVS setting.

In still another example, for current mobile device software implementations, such as Advanced Mobile Subscriber Software (AMSS), when a wireless data application is enabled, the maximum processor and data bus performance level is requested during the entire data call. This request is typically independent of the actual data rate or whether or not there is any data transfer. Based on empirical evidence for actual wireless communication systems, for example Evolution Data Optimized (EV-DO) revision A forward link, a data call at the maximum data rate does not require that the processor and data bus be fully utilized. Thus, based on such evidence, the DCVS default parameters may be modified in such situations to better optimize processor utilization and, thereby better optimize power resources.

In yet one more example, low data throughput in a wireless communication system, such as EV-DO, may be due to numerous factors. For example, the nature of a particular application may drive low data throughput if the application requires only light data transfer, if the data buffer depth is generally low, and if the application does not require high processor clock speed even if the instantaneous data rate is high.

In light of the examples discussed above as well as other situations adversely affecting data throughput, performance, and power usage, the present apparatus and methods provide modification or adjustment of parameters to regulate the processor clock speed for mobile device power management. In particular, the methods and apparatus modify parameters to regulate processor clock speed based on at least the data buffer depth.

Figure 4:
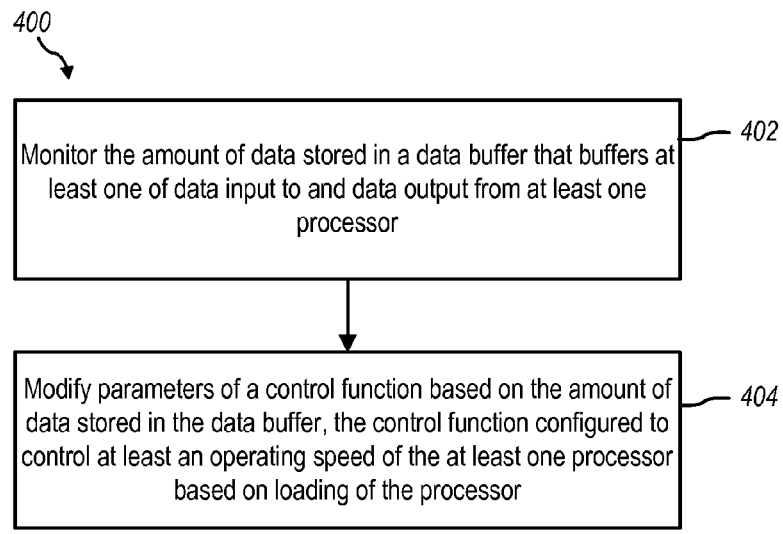
FIG. 4 is a flow diagram of a method for monitoring and modifying control function parameters based on at least the state of data buffers according to an aspect of the present disclosure.

In one aspect illustrated by FIG. 4, a method 400 is shown for modifying or changing a power optimization control function, such as DCVS based on the buffer depth. Method 400 includes monitoring the amount of data stored in a data buffer that buffers at least one of data input to and data output from at least one processor as shown in block 402. In an aspect, these processes may be implemented by memory monitors 302, which monitor buffer(s) 116, and control manager 112. As shown in block 404, parameters of a control function are modified based on the amount of data stored in the data buffer, where the control function is configured to control at least an operating speed of the at least one processor based on loading of the processor, such as in the case of DCVS. In one example, the processes of block 404 may be implemented by control manager 112 in communication with module 308, which may be an API for changing DCVS parameters.

Figure 5:
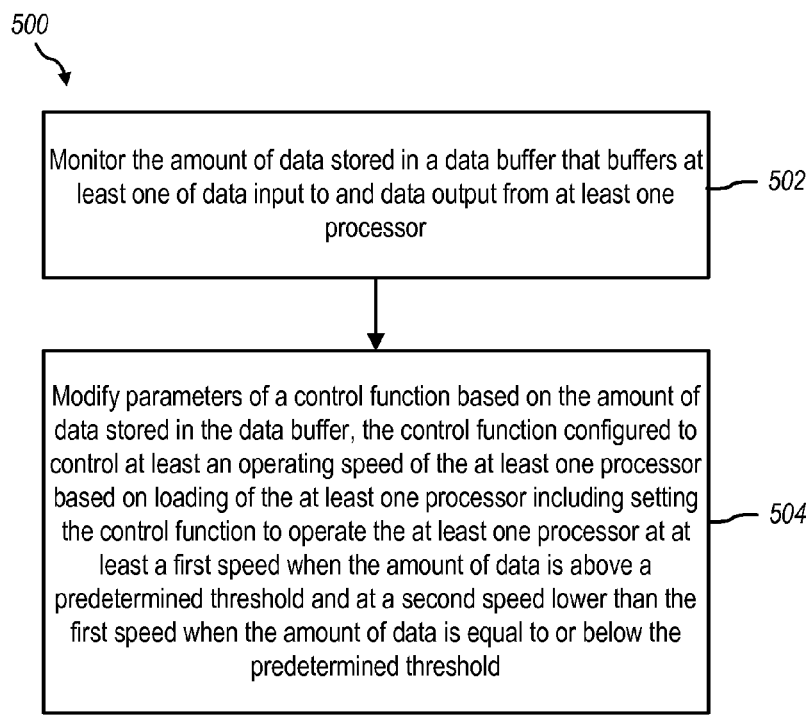
FIG. 5 is a flow diagram of another method for monitoring and modifying control function parameters based on at least the state of data buffers according to an aspect of the present disclosure.

FIG. 5 illustrates a flow diagram of another method 500 for modifying or changing a power optimization control function wherein CPU speed is scaled between two or more speeds based on the data buffer depth or loading. Method 500 includes monitoring the amount of data stored in a data buffer that buffers at least one of data input to and data output from at least one processor as shown in block 502. In an aspect, this process may be implemented by memory monitors 302, which monitor buffer(s) 116, and control manager 112.

After monitoring, parameters of a control function are modified based on the amount of data stored in the data buffer as illustrated by block 504. As further shown in block 504, the modification of the control function parameters includes setting the control function to operate the at least one processor at least a first speed when the amount of data is above a predetermined threshold and at a second speed lower than the first speed when the amount of data is equal to or below the predetermined threshold. It is noted that method 500 is not limited to two scaled CPU speeds, but could include a number of CPU speeds or response times based on different monitored levels of the data buffer(s). In one example, the processes of block 504 may be implemented by control manager 112 in communication with module 308, which may be an API or similar functionality for changing DCVS parameters. It is noted here that various DCVS parameters may include, but are not limited to, filter time constants for DCVS, thresholds for the CPU speed thresholds, thresholds for data buffers (upper and lower), buffer floors, and other time constants.

In an aspect, method 500 affords quick setting of the CPU speed when the data buffer depth changes. This, in turn, results in faster response by the CPU than default DCVS parameters, which prevents data loss.

Figure 6:
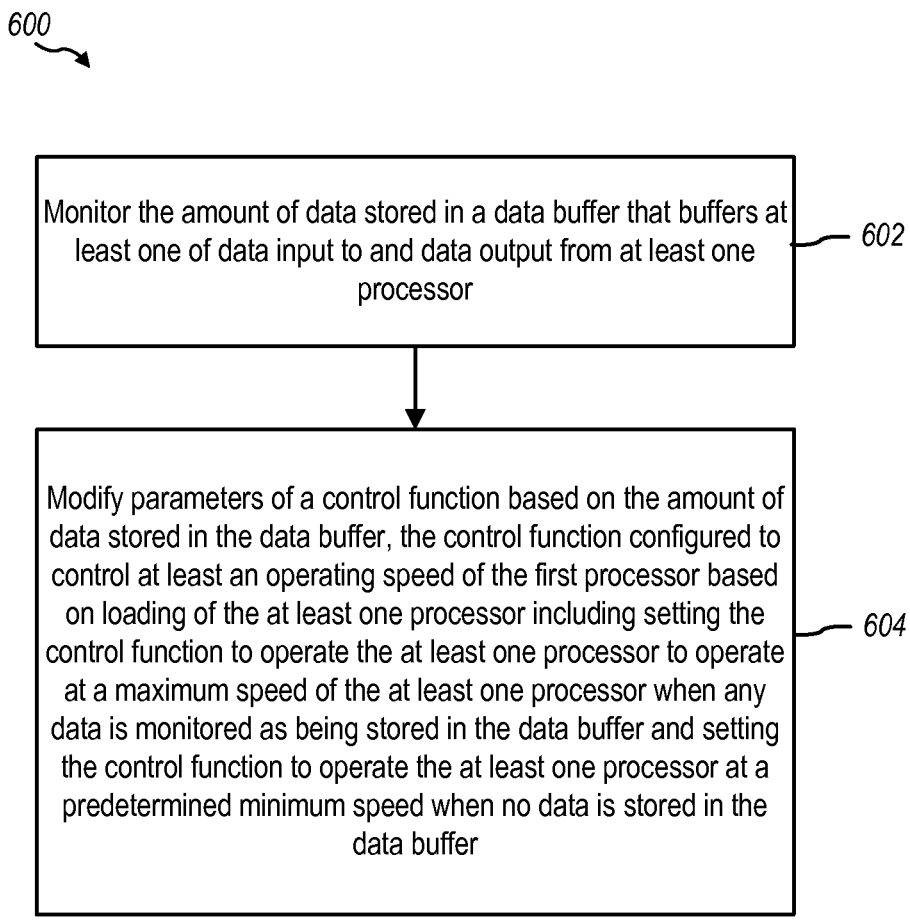
FIG. 6 is a flow diagram of still another method for monitoring and modifying control function parameters based on at least the state of data buffers according to an aspect of the present disclosure.

FIG. 6 illustrates a flow diagram of another method 600 for modifying or changing a power optimization control function wherein CPU speed is scaled between two or more speeds based on the data buffer depth or loading. Method 600 includes monitoring the amount of data stored in a data buffer that buffers at least one of data input to and data output from at least one processor as shown in block 602. In an aspect, this process may be implemented by memory monitors 302, which monitor buffer(s) 116, and control manager 112.

Figure 7:
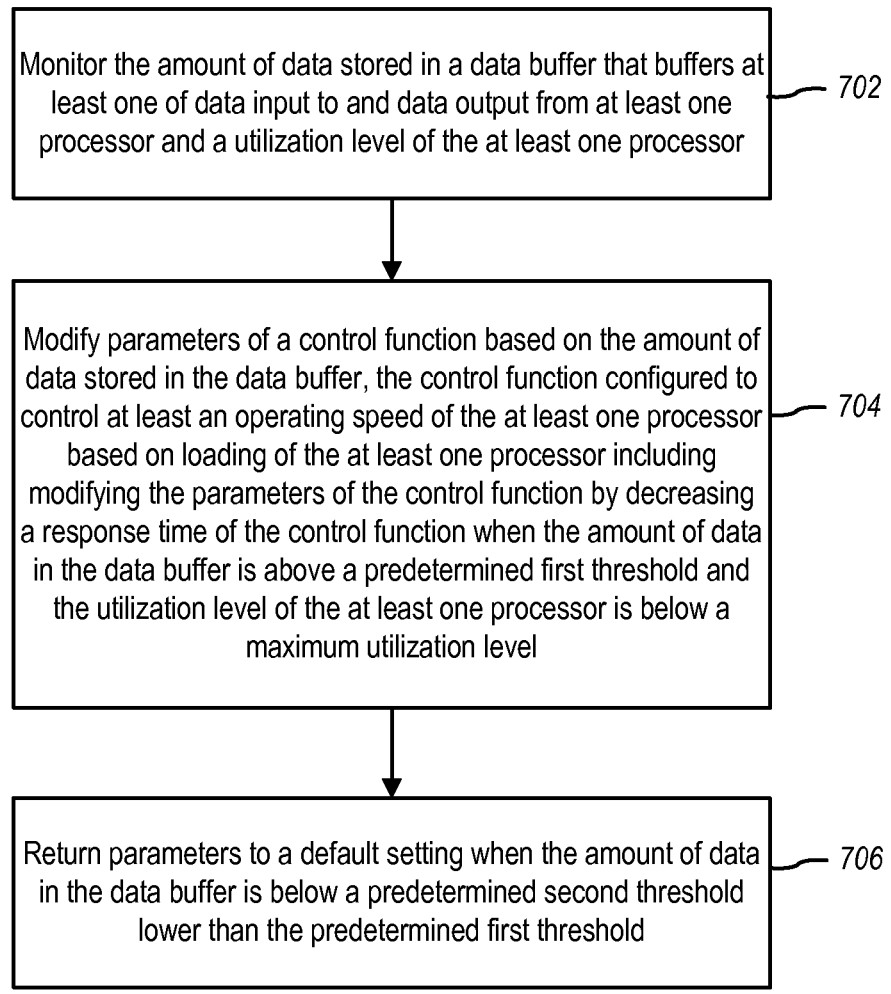
FIG. 7 is a flow diagram of yet another method for monitoring and modifying control function parameters based on at least the state of data buffers according to an aspect of the present disclosure.

After monitoring, parameters of a control function are modified based on the amount of data stored in the data buffer as illustrated by block 604. As further shown in block 504, the modification of the control function parameters includes setting the control function to operate the at least one processor to operate at a maximum speed of the at least one processor when any data is monitored as being stored in the data buffer and setting the control function to operate the at least one processor at a predetermined minimum speed when no data is stored in the data buffer. In one example, the processes of block 504 may be implemented by control manager 112 in communication with module 308, which may be an API or similar functionality for changing DCVS parameters. In an aspect, method 600 allows the at least the same data throughput performance as a default setting, yet with the benefit of saving power when there is no data in the buffer FIG. 7 illustrates a flow diagram of yet another method 700 for modifying or changing a power optimization control function in a wireless device. Method 700 includes monitoring the amount of data stored in a data buffer that buffers at least one of data input to and data output from at least one processor as shown in block 702. In an aspect, this process may be implemented by memory monitors 302, which monitor buffer(s) 116, and control manager 112. Block 702 also illustrates that method 700 may also include monitoring a utilization level of the at least one processor. In an example, this process may be effected by CPU monitor 306 and control manager 112.

As illustrated in block 704, method 700 also includes modify parameters of a control function, such as a DCVS function, based on the amount of data stored in the data buffer. The processes of block 704 also include modifying the parameters of the control function by decreasing a response time of the control function when the amount of data in the data buffer is determined to be above a predetermined first threshold, such as a high threshold, and the utilization level of the at least one processor is determined to be below a maximum utilization level. Thus, In an aspect, method 700 may also include an initial setting where a minimum CPU speed is first established when a data call is enabled (not shown in FIG. 7). As long as the conditions of block 704 are not met, the default DCVS algorithm may be used to adjust the CPU speed. Furthermore, method 700 provides that when the data buffer depth exceeds a high threshold and the CPU is not yet at maximum performance level, a request may be made to modify the DCVS algorithm to have a smaller response time. Moreover, when the data buffer depth is below a second predetermined threshold, such as a low threshold, method 700 may provide resumption of the default DCVS response time as indicated by block 706. Method 700 thus allows that the CPU speed does not unnecessarily need to be increased when data is stored in the data buffer for those levels below a predetermined depth (i.e., the first or high predetermined threshold) that is too high for the CPU to adequately handle at a default response time when also the CPU utilization level is below a maximum level where the CPU has reserve capacity to lower response time.

Figure 8:
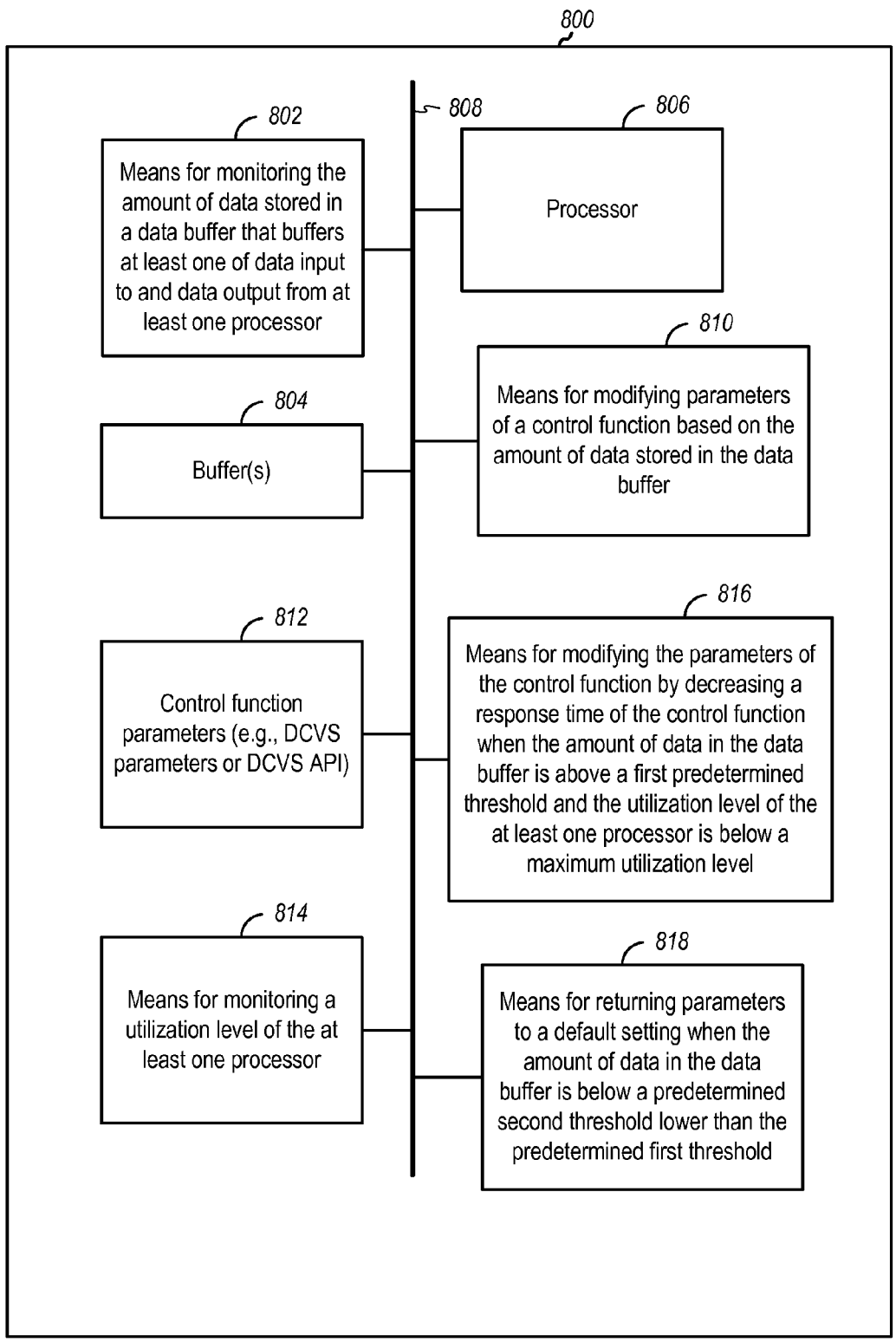
FIG. 8 is a block diagram of an apparatus for monitoring data rate flow and changing parameters of at least a power optimizing control function in a wireless device.

FIG. 8 illustrates a block diagram of an apparatus 800 for monitoring data rate flow and changing parameters of at least a power optimizing control function in a wireless device. Apparatus 800 may be a wireless device, such as device 100, or a portion of a wireless device, such as modem chipset 102. Apparatus 800 includes a means 802 for monitoring the amount of data stored in a data buffer(s) 804 that buffers at least one of data input to and data output from at least one processor 806. In an aspect, the data input or output to buffer 804 is from or to a digital signal processor (not shown in FIG. 8), such as is shown in the data flow of FIG. 2. In an example, means 802 may be implemented by monitor 302 in conjunction with control manager 112. It is noted here that apparatus 800 is shown with a communicative coupling 808, which may be embodied by a communication bus or similar means for communicatively coupling the various modules and units in apparatus 800.

Apparatus 800 also includes means 810 for modifying parameters 812 of a control function, such as DCVS, based on the amount of data stored in the data buffer 804, the control function being configured to control at least an operating speed of the at least one processor 806 based on loading of the processor. In one example, means 810 may be implemented by control manager 112 in conjunction with an interface, such as an API, to the parameters (e.g., 308).

Further, apparatus may include additional means 814 for monitoring a utilization level of the at least one processor 806. Means 814 may be implemented, in one example, by monitor 306 in conjunction with control manager 112. Using the monitoring by means 814, apparatus 800 also includes a means 816 for modifying the parameters of the control function by decreasing a response time of the control function when the amount of data in the data buffer is above a first predetermined threshold and the utilization level of the at least one processor is below a maximum utilization level. Means 816 may be implemented, in one example, by control manager 112 in conjunction with 308. Finally, in an aspect apparatus 800 may also include means 818 for returning parameters to a default setting when the amount of data in the data buffer is below a predetermined second threshold lower than the predetermined first threshold used by means 816.

It is also noted that modification of the control function parameters (e.g., DCVS parameters) may be include based on monitoring the radio link or datalink of a wireless connection, such as via monitoring of a radio link 312 shown in FIG. 3. For example, if the radio link is fading or of poor quality, the parameters may be modified to allow a slower CPU response time since buffering or CPU processing can be ruled out as the cause of slower data throughput. It is noted that one or both of the radio link and datalink, which may be interrelated but are not synonymous, can be monitored.

It is understood that the specific order or hierarchy of steps in the processes disclosed is merely an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module or computer program product comprising computer executable instructions stored on a medium and executable by a processor or computer, or in any combination thereof. A software module or medium may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed examples is provided to enable any person skilled in the art to make or use the present invention. Various modifications to these examples will be readily apparent to those skilled in the art, and the generic principles defined herein may be applied to other embodiments without departing from the scope of the present invention. Thus, the present invention is not intended to be limited to the examples shown herein but is to be accorded the widest scope consistent with the principles and novel features disclosed herein.

What is claimed is:

1. A method for power optimization in a wireless device comprising:
   monitoring the amount of data stored in a data buffer that buffers at least one of data input to and data output from at least one processor;
   modifying parameters of a control function based on the amount of data stored in the data buffer, the control function configured to control at least an operating speed of the at least one processor based on loading of the at least one processor;
   monitoring a utilization level of the at least one processor; and
   modifying the parameters of the control function by decreasing a response time of the control function when the amount of data in the data buffer is above a first predetermined threshold and the utilization level of the at least one processor is below a maximum utilization level.

2. The method as defined in claim 1, further comprising:
   returning the parameters of the control function to a default setting when the amount of data in the data buffer falls below a second predetermined threshold lower than the first predetermined threshold.

3. A method, for power optimization in a wireless device comprising:
   monitoring an indicator of a condition of a radio link in use by the wireless device; and
   deciding whether to modify parameters of a control function based on the indicator, the control function configured to control at least an operating speed of the at least one processor;
   wherein deciding whether to modify parameters of the control function is based on the amount of data stored in a transmit data buffer and a utilization level of the at least one processor such that the control function operates the at least one processor at a higher speed when data is stored in a data buffer and setting the control function to operate the at least one processor at a speed lower than the higher speed when no data is stored in the data buffer, and wherein said indicator is a filled level of the transmit buffer, and wherein said deciding further includes deciding not to modify the parameters if the transmit buffer is filled beyond a first predetermined threshold and said utilization level is below a second predetermined threshold.

4. The method as defined in claim 3 wherein the control function is a Dynamic Clock and Voltage Scaling (DCVS) function.

5. The method as defined in claim 4, wherein modifying parameters comprises changing at least one of DCVS sensitivity, DCVS response time, processor frequency, a processor time constant, a processor floor, a processor threshold, and DCVS filter time constants.

6. The method of claim 3, wherein said indicator includes re-transmission activity on the radio link, and wherein said deciding includes deciding to modify the parameters if said utilization level is above a predetermined threshold in support of the re-transmission activity.

7. An apparatus for power optimization in a wireless device, the apparatus comprising:

at least one first monitor configured to monitor the amount of data stored in a data buffer that buffers at least one of data input to and data output from at least one processor in the wireless device;

a control unit configured to modify parameters of a control function based on the amount of data stored in the data buffer, the control function configured to control at least an operating speed of the at least one processor based on loading of the at least one processor;

at least one second monitor configured to monitor a utilization level of the at least one processor; and wherein the control unit is further configured to modify the parameters of the control function by decreasing a response time of the control function when the amount of data in the data buffer is above a first predetermined threshold and the utilization level of the at least one processor is below a maximum utilization level.

8. The apparatus as defined in claim 7, wherein the control unit is further configured to:

return the parameters of the control function to a default setting when the amount of data in the data buffer falls below a second predetermined threshold lower than the first predetermined threshold.

9. An apparatus for power optimization in a wireless device, the apparatus comprising:

at least one first monitor configured to monitor an indicator of a condition of a radio link in use by the wireless device; and a control unit configured to decide whether to modify parameters of a control function based on said indicator and a utilization level of at least one processor, the control function configured to control at least an operating speed of the at least one processor;

wherein deciding whether to modify parameters of the control function with the control unit is based on the amount of data stored in a transmit data buffer and a utilization level of the at least one processor such that the control function operates the at least one processor at a higher speed when data is stored in a data buffer and setting the control function to operate the at least one processor at a speed lower than the higher speed when no data is stored in the data buffer, and wherein said indicator is a filled level of the transmit buffer, and wherein said control unit decides not to modify the parameters if the transmit buffer is filled beyond a first predetermined threshold and said utilization level is below a second predetermined threshold.

10. The apparatus as defined in claim 9 wherein the control function is a Dynamic Clock and Voltage Scaling (DCVS) function.

11. The apparatus as defined in claim 10, wherein the control function parameters comprise at least one of DCVS sensitivity, DCVS response time, processor frequency, a processor time constant, a processor floor, a processor threshold, and DCVS filter time constants.

12. The apparatus of claim 9, wherein said indicator includes re-transmission activity on the radio link, and wherein said control unit decides to modify the parameters if said utilization level is above a predetermined threshold in support of the re-transmission activity.

13. An apparatus for power optimization in a wireless device comprising:

means for monitoring the amount of data stored in a data buffer that buffers at least one of data input to and data output from at least one processor;

means for modifying parameters of a control function based on the amount of data stored in the data buffer, the control function configured to control at least an operating speed of the at least one processor based on loading of the at least one processor;

means for monitoring a utilization level of the at least one processor; and means for modifying the parameters of the control function by decreasing a response time of the control function when the amount of data in the data buffer is above a first predetermined threshold and the utilization level of the at least one processor is below a maximum utilization level.

14. The apparatus as defined in claim 13, further comprising:

means for returning the parameters of the control function to a default setting when the amount of data in the data buffer falls below a second predetermined threshold lower than the first predetermined threshold.

15. An apparatus for power optimization in a wireless device comprising:

means for monitoring an indicator of a condition of a radio link in use by the wireless device;

means for deciding whether to modify parameters of a control function based on said indicator and a utilization level of at least one processor, the control function configured to control at least an operating speed of the at least one processor, wherein deciding whether to modify parameters of the control function with the means for deciding is based on the amount of data stored in a transmit data buffer and a utilization level of the at least one processor; and means for setting at the control function to operate the at least one processor at a higher speed when data is stored in a data buffer and setting the control function to operate the at least one processor at a speed lower than the higher speed when no data is stored in the data buffer; wherein said indicator is a filled level of the transmit buffer, and wherein said deciding further includes deciding not to modify the parameters if the transmit buffer is full beyond a first predetermined threshold and said utilization level is below a second predetermined threshold.

16. The apparatus as defined in claim 15, wherein the control function is a Dynamic Clock and Voltage Scaling (DCVS) function.

17. The apparatus as defined in claim 16, wherein control function parameters comprise at least one of DCVS sensitivity, DCVS response time, processor frequency, a processor time constant, a processor floor, a processor threshold, and DCVS filter time constants.

18. The apparatus of claim 15, wherein said indicator includes re-transmission activity on the radio link, and wherein said deciding includes deciding to modify the parameters if said utilization level is above a predetermined threshold in support of the re-transmission activity.

19. A computer program product, comprising:

a non-transitory computer-readable medium having embodied thereon:

code for causing a computer to monitor the amount of data stored in a data buffer that buffers at least one of data input to and data output from at least one processor in a wireless device;

code for causing a computer to modify parameters of a control function based on the amount of data stored in the data buffer, the control function configured to control at least an operating speed of the at least one processor based on loading of the at least one processor;

code for causing a computer to monitor a utilization level of the at least one processor; and code for causing a computer to modify the parameters of the control function by decreasing a response time of the control function when the amount of data in the data buffer is above a first predetermined threshold and the utilization level of the at least one processor is below a maximum utilization level.

20. The computer program product as defined in claim 19, further comprising:

code for causing a computer to return the parameters of the control function to a default setting when the amount of data in the data buffer falls below a second predetermined threshold lower than the first predetermined threshold.

21. A computer program product, comprising:

a non-transitory computer-readable medium comprising having embodied thereon:

code for causing a computer to monitor an indicator of a condition of a radio link in use by the wireless device;

code for causing a computer to decide whether to modify parameters of a control function based on said indicator and a utilization level of at least one processor, the control function configured to control at least an operating speed of the at least one processor, wherein deciding whether to modify parameters of the control function with the means for deciding is based on the amount of data stored in a transmit data buffer and a utilization level of the at least one processor; and code for setting at the control function to operate the at least one processor at a higher speed when data is stored in a data buffer and setting the control function to operate the at least one processor at a speed lower than the higher speed when no data is stored in the data buffer;

code for causing a computer to set parameters of the control function to operate the at least one processor at a maximum speed of the at least one processor when data is stored in a data buffer that buffers at least one of inputs to and outputs from the at least one processor; and code for causing a computer to set parameters of the control function to operate the at least one processor at a predetermined minimum speed when no data is stored in the data buffer, wherein said indicator is a filled level of the transmit buffer, and wherein said deciding includes deciding not to modify the parameters if the transmit buffer is full beyond a first predetermined threshold and said utilization level is below a second predetermined threshold.

22. The computer program product as defined in claim 21, wherein the control function is a Dynamic Clock and Voltage Scaling (DCVS) function.

23. The computer program product as defined in claim 22, wherein the control function parameters comprise at least one of DCVS sensitivity, DCVS response time, processor frequency, a processor time constant, a processor floor, a processor threshold, and DCVS filter time constants.

24. The computer program product of claim 21, wherein said indicator includes re-transmission activity on the radio link, and wherein said deciding includes deciding to modify the parameters if said utilization level is above a predetermined threshold in support of the re-transmission activity.

\* \* \* \* \*